Patented Nov. 27, 1934

1,982,180

UNITED STATES PATENT OFFICE 1,982,180

PHENOL DERIVATIVE AND METHOD OF PREPARING SAME

Fritz E. Stockelbach, Montclair, N. J., assignor to Harold H. Fries, doing business as Fries Bros., New York, N. Y.

No Drawing. Application October 30, 1931, Serial No. 572,219

6 Claims. (Cl. 260—154)

The present invention relates to phenol derivatives having antiseptic, disinfectant, germicidal, and the like properties and to the method of preparing such derivatives. More especially it relates to such substances that are obtainable by the reaction of a phenolic compound with a tertiary alcohol, and more particularly by the reaction of meta cresol with tertiary butyl alcohol and tertiary amyl alcohol.

Most, if not all, of the well known phenolic compound antiseptics and germicides are either aromatic alcohols or substitutes of primary and secondary alcohols. Among these are the alkyl derivatives of meta cresol, and more particularly those having an alkyl group in para position to the methyl group. Thymol or 3-hydroxy-1-methyl-4-isopropyl benzene is a well known example from said class of compounds.

I have discovered that tertiary alcohol substitutes of phenolic compounds are remarkably strong germicides, and more particularly that the tertiary alcohol substitutes of meta cresol in which the alkyl group is in para position have phenol coefficients many times higher than the well known antiseptic thymol.

The preparation of these tertiary alcohol substitutes of meta cresol, I have found, is best carried out through the condensation of the corresponding tertiary alcohol with meta cresol, using zinc chloride as the condensing agent. An example of the method followed in the preparation of 3-hydroxy-1-methyl-4-tertiary butyl benzene is as follows: 300 grams meta cresol, 2250 grams tertiary butyl alcohol and 2250 grams of zinc chloride are mixed, and under constant stirring are heated for two or three hours until the reaction is completed. The mixture is then washed until the wash water does not give any reaction for chlorides, and thereafter it is dried and fractionally distilled in a flash with an efficient column.

The condensation or reaction product consists of a mixture of para tertiary butyl meta cresol, some of the symmetrical tertiary butyl substitutes and some dibutyl substitutes. It is accordingly necessary to separate these compounds by careful fractionation and purification. The boiling ranges of the fractions and the percentages thereof are approximately as follows at 5 mm. pressure:

(1) Up to 90° C. . . 9%, which contains an excess of water and butyl alcohol.
(2) From 90 to 92° C. . . 6.2%, which contains an excess of meta cresol.
(3) From 92 to 108° C. . . 55%, which contains the para tertiary butyl meta cresol.
(4) From 108 to 120° C. . . 23.6%, which contains the dibutyl substitutes.
(5) Residue, 8.2%.

The fraction (3), which contains the para tertiary butyl meta cresol, has a congealing point of approximately 13-14° C., and in order to purify it and obtain therefrom the pure para compound, said fraction (3) is cooled to about 10° C. and then allowed to drain until all the liquid isomers are drained off. It is then dissolved in a small amount of petroleum ether, chilled, and the remainder of the liquid isomers again allowed to drain off. It is finally centrifuged, whereby a crystalline produce is obtained having a melting point of from 34-35° C. and a boiling point of 255-257° C. at 760 mm. This pure product has a characteristic odor somewhat resembling thymol, although sharper, and it exists in two modifications—a labile and a stable form. The product obtained as above described having a melting point of 34-35° C. is the labile form, which gradually changes over on standing, and more quickly on melting, into the stable form, which has a melting point of 23.1° C.

Tertiary amyl alcohol may be used in a way similar to tertiary butyl alcohol in obtaining antiseptics and germicides of the class described, and the mode of procedure is exactly the same. The product obtained in this way, namely, 3-hydroxy-1-methyl-4-tertiary amyl benzene has a boiling point of 254-256° C. and is a liquid having a sp. gr.$_{20}$ of 0.9636 and a refractive index$_{20}$ of 1.5198.

From the foregoing detailed description it will be appreciated that I have discovered a new class of powerful antiseptics and germicides and have set forth in detail the mode of procedure in obtaining the same in a pure state, and hence the invention is not to be considered as limited to the specific compounds enumerated, but is equally applicable in the preparation of antiseptics or germicides comprising as a constituent thereof the reaction product of a phenolic compound and a tertiary alcohol.

What I claim is:

1. A compound having the structural formula

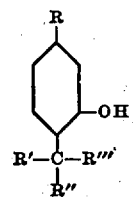

wherein R, R', R'' and R''' indicate like or unlike alkyl groups.

2. A compound according to claim 1 wherein R, R', R'' and R''' each indicates a methyl group.

4. The chemical compound 3-hydroxy-1-methyl-4-tertiary butyl benzene, said compound upon being crystallized from petroleum ether having a melting point of 34–35° C. and a boiling point of 255–257° C. at 760 mm.

4. The chemical compound 3-hydroxy-1-methyl-4-tertiary butyl benzene having a melting point of 23.1° C. and a boiling point of 255–257° C. at 760 mm.

5. The method of producing a derivative of meta cresol having an alkyl radical of a tertiary alcohol in para position to the methyl group which comprises condensing meta cresol and tertiary butyl alcohol in the presence of zinc chloride as condensing agent, washing the resulting product, fractionating said product, and obtaining the desired compound from the fraction coming over between 92–108° C. at 5 mm. pressure.

6. The method according to claim 5 wherein the fraction specified is subjected to a temperature somewhat below its congealing point to separate the crystalline para compound from the other isomers, and then recrystallizing said compound from a solvent to obtain the compound in a pure state.

FRITS E. STOCKELBACH.

CERTIFICATE OF CORRECTION.

Patent No. 1,982,180.　　　　　　　　　　　　　　　　November 27, 1934.

FRITS E. STOCKELBACH.

It is hereby certified that error appears in the printed specification of the above numbered patent requiring correction as follows: Page 1, line 117, for the claim number "4" read 3; and that the said Letters Patent should be read with this correction therein that the same may conform to the record of the case in the Patent Office.

Signed and sealed this 5th day of February, A. D. 1935.

Leslie Frazer (Seal)　　　　　　　　　　　　　　　　　　　　　　Acting Commissioner of Patents.

having a melting point of 34-35° C. and a boiling point of 255-257° C. at 760 mm.

4. The chemical compound 3-hydroxy-1-methyl-4-tertiary butyl benzene having a melting point of 23.1° C. and a boiling point of 255-257° C. at 760 mm.

5. The method of producing a derivative of meta cresol having an alkyl radical of a tertiary alcohol in para position to the methyl group which comprises condensing meta cresol and tertiary butyl alcohol in the presence of zinc chloride as condensing agent, washing the resulting product, fractionating said product, and obtaining the desired compound from the fraction coming over between 92-108° C. at 5 mm. pressure.

6. The method according to claim 5 wherein the fraction specified is subjected to a temperature somewhat below its congealing point to separate the crystalline para compound from the other isomers, and then recrystallizing said compound from a solvent to obtain the compound in a pure state.

FRITS E. STOCKELBACH.

CERTIFICATE OF CORRECTION.

Patent No. 1,982,180.    November 27, 1934.

FRITS E. STOCKELBACH.

It is hereby certified that error appears in the printed specification of the above numbered patent requiring correction as follows: Page 1, line 117, for the claim number "4" read 3; and that the said Letters Patent should be read with this correction therein that the same may conform to the record of the case in the Patent Office.

Signed and sealed this 5th day of February, A. D. 1935.

Leslie Frazer (Seal)    Acting Commissioner of Patents.